July 14, 1970  F. W. BENTLEY  3,520,618
HEADLAMP INSTRUMENT

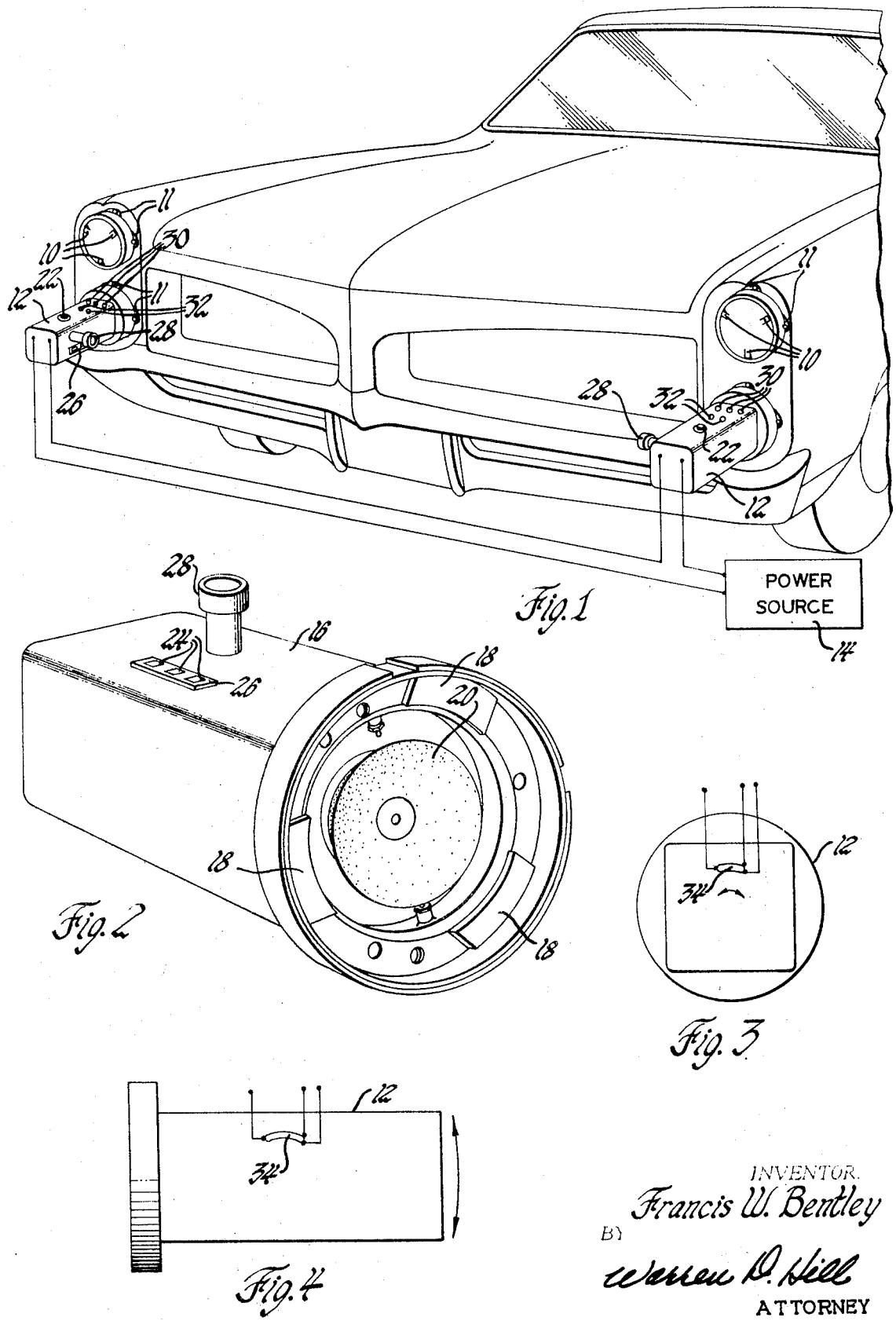

Filed April 21, 1967  2 Sheets-Sheet 2

INVENTOR.
Francis W. Bentley
BY
Warren D. Hill
ATTORNEY

United States Patent Office 3,520,618
Patented July 14, 1970

3,520,618
HEADLAMP INSTRUMENT
Francis W. Bentley, Pontiac, Mich., assignor to General Motors Corporation, Detroit, Mich., a corporation of Delaware
Filed Apr. 21, 1967, Ser. No. 632,636
Int. Cl. G01j 1/00
U.S. Cl. 356—121        5 Claims

ABSTRACT OF THE DISCLOSURE

The headlamp aiming apparatus includes a pair of devices, each to be secured to a vehicle headlamp, electrical means including gravity sensing electrolytic transducers and indicating lamps indicating when each instrument has been leveled. A light beam from each device illuminates one of a series of photocells on the other device and a circuit including indicating lamps and the photocells indicates when the instruments are parallel to the longitudinal axis of the vehicle and if not parallel, show the direction of error.

---

This invention relates to headlamp aiming instruments and particularly to such instruments having electrically controlled indicators to signal the headlamp attitudes. Present day vehicle headlamps are generally of the variety commonly referred to as seal beam lamps which carry on their lenses, a plurality of pads which define an aiming plane. The lamps are so designed that for each type of lamp, the axis of the light beam emitted by the lamp is at a specified angle to the aiming plane so that when the lamps are installed on the front of a vehicle with the aiming plane perpendicular to the longitudinal axis of the vehicle, the light beam will be properly focused on the ground or roadway ahead of the vehicle.

Conventionally, headlamp aiming instruments are employed to assist in properly adjusting the lamps so that the aiming planes of the lamps will be in a vertical plane and perpendicular to the longitudinal axis of the vehicle, assuming that the vehicle is resting on a level floor. An aiming instrument is secured to the lamp so that reference points on the instrument contact the aiming points and the instrument is rotated about an axis perpendicular to the aiming plane to level the instrument. Then the headlamp is adjusted until the instrument is level about its other horizontal axis. Finally, the headlamp is adjusted until the aiming plane is perpendicular to the longitudinal axis of the vehicle. In prior devices, these two level adjustments generally required the observance of spirit levels or other devices by an operator and the parallel adjustment similarly required visual observance of the operator of some mechanical or optical condition for indicating proper adjustment. For each adjustment, the judgment of the operator was relied upon to determine when the three adjustments were properly made, which operation leads to inaccuracies as well as being a time consuming method.

A general object of this invention is to provide a vehicle headlamp aiming instrument.

A further object is to provide a headlamp aiming instrument having electrical means for sensing and indicating levelness of the instrument.

Another object is to provide a headlamp aiming instrument having combined electrical and optical means for sensing and indicating parallelness of the instrument.

The invention is carried out by incorporating in a headlamp aiming instrument, a gravity sensing electrolytic transducer for sensing levelness of the instrument.

The invention is further carried out by providing electrical means for determining levelness of a headlamp aiming instrument.

The invention is also carried out by providing an electrically interconnected pair of headlamp aiming instruments with optical orientation means combined with electrical indicating means to determine when the two instruments are parallel.

More particularly, the invention is carried out by providing a pair of electrical interconnected headlamp aiming instruments each incorporating a lamp for emitting a light beam toward the other instrument and light sensing means with an indicating circuit for determining when each instrument is parallel with the longitudinal axis of the vehicle and for determining the direction of any alignment error.

The above and other advantages will be made more apparent from the following specification taken on conjunction with the accompanying drawings wherein like reference numerals refer to like parts and wherein:

FIG. 1 is a perspective view of a vehicle having a pair of aiming instruments mounted on a pair of headlamps;

FIG. 2 is a view of the portion of an aiming instrument which engages the headlamps;

FIGS. 3, 4 and 5 are diagrammatic representations of aiming instruments illustrating the lamp adjustment steps;

Figure 5:
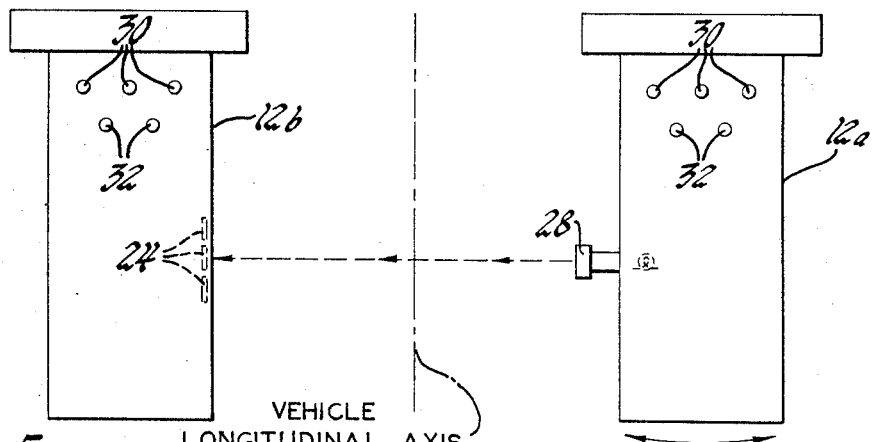

FIG. 1 illustrates a vehicle having two pairs of headlamps, one mounted above the other, each headlamp having three aiming pads 10 which establish an aiming plane for each lamp. The headlamps are adjustably mounted on the vehicle in a conventional manner by screw means 11 so that the lamps may be adjusted for aiming purposes by manually turning the screws. An aiming device comprises a pair of aiming instruments 12 connected to each other and to a power source 14 by electrical conductors. Each instrument 12 includes, as best shown in FIG. 2, a housing 16 supporting at one end three reference surfaces 18 each for engaging an aiming pad on the headlamp. These reference surfaces are precisely formed and so arranged on the housing 16 that the longitudinal axis of the housing is perpendicular to the plane estabilshed by the reference surfaces and accordingly, that axis will be perpendicular to the aiming plane of the headlamps when the instrument is attached to the headlamp. Means are provided for securing each instrument to a headlamp which comprises a suction cup 20 which, if desired, may be attached to a vacuum line and control of the vacuum to the suction cup may be asserted by means of a push button 22 mounted on the housing. Three photocells 24 or other light sensitive devices are disposed within a window 26 in each housing and exposed at one side thereof. A projection lamp 28 mounted on the same side of the housing as the photocells is aimed toward the photocells 24 of the opposite aiming instrument and preferably projects a collimated beam about 2 inches high and ⅛ inch wide so as to illuminate one of the photocells depending upon the alignment of the instrument. Preferably the light beam is parallel to the aiming plane. The housing further contains on the top thereof, a display panel having three telltale lamps 30 which form part of the parallelness indicating circuits and two other lamps 32, each forming a part of a levelness indicating circuit. Levelness is sensed by gravity sensing electrolytic transducers 34 within the housing as represented in FIGS. 3 and 4.

Figure 6:
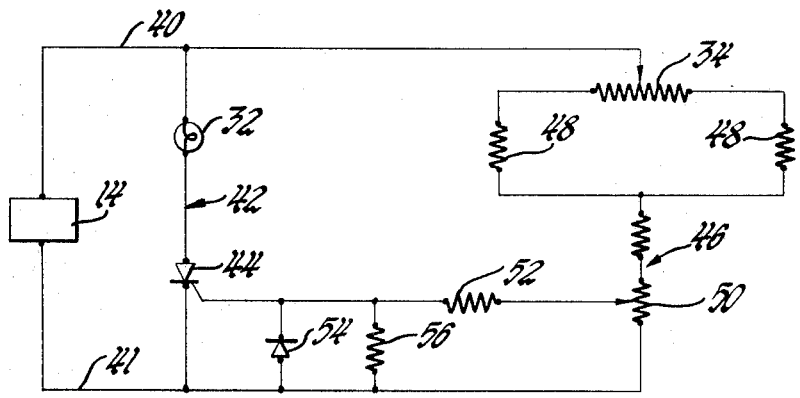
FIG. 6 is a schematic diagram of levelness indication circuitry for an aiming device according to the invention; and, FIG. 7 is a schematic diagram of parallelness indicating and detecting circuitry for an aiming device according to the invention.

The specific circuit for the levelness indicators is illustrated in FIG. 6. Power supply lines 40 and 41 connected across a 10-volt AC source from the power supply 14 apply voltage to two branch circuits in parallel; the first branch circuit 42 including a telltale lamp 32 in series with a silicon controlled rectifier 44. The second branch circuit 46 contains a gravity sensing electrolytic transducer 34 which electrically is equivalent to a potentiometer having a sliding center tap, the center tap being at midpoint of the resistor when the transducer is level, but when the transducer is not level, the center tap is, in effect, displaced to one side to vary the resistance. The ends of the resistor are connected to a pair of resistors 48 which have a common junction point connected to the supply line 41 through a potentiometer 50. The center tap of the potentiometer 50 is connected through a resistance 52 to the gate electrode of the SCR 44. A biasing diode 54 and resistor 56 are connected between the gate and the power supply line 41. In operation, the circuit branch 46 including the transducer will have a relatively low resistance when the transducer is not level so that a relatively high voltage is applied to the grid of the SCR, causing the SCR to turn on and the telltale lamp to light. However, the resistance of the circuit rapidly increases as the transducer approaches level condition so that the current through the transducer branch 46 of the circuit is reduced and consequently, the voltage applied to the SCR gate is lowered, turning off SCR and the lamp thereby providing a signal that a level condition has been obtained.

Figure 7:
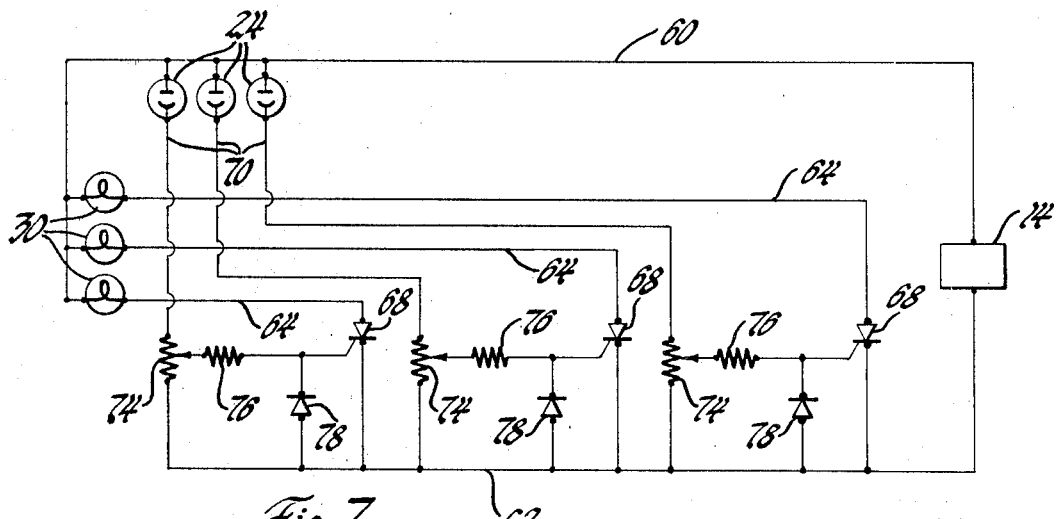

FIG. 7 illustrates the circuit for indicating parallelness which includes a pair of power supply lines 60 and 62 across a 10-volt AC source from the power source 14 and includes three lamp circuits 64 across the power supply lines, each comprising a telltale lamp 30 in series with an SCR 68 and further including three photocell circuits 70 across the power supply line, each including a photocell 24 in series with a potentiometer 74. The center tap of each potentiometer 74 is connected through a resistor 76 to the gate of one of the SCR's 68 and a biasing diode 78 is connected between the SCR gate and the power supply line 62. When the photocells are dark, there is essentially no current through the potentiometers and no trigger signal is applied to the SCR gates so that the SCR's are off and the telltale lamps are dark. However, when one of the photocells is illuminated, a trigger signal is supplied from the center tap of the corresponding potentiometer and the SCR is rendered conductive to light a telltale lamp 30. The photocells are arranged so that the one in the middle will be illuminated by the light beam from the opposite aiming instrument 12 when the opposite instrument is parallel to the longitudinal axis of the vehicle, as depicted in FIG. 5. Accordingly, when the center telltale lamp is lit, a parallelness indication is provided. However, when the instrument is not parallel to the said axis, the light beam will fall on one of the other photocells and one of the other telltale lamps will be lit to indicate the direction of deviation from the parallel so that an appropriate adjustment of the headlamp will be made. Thus, the circuit of FIG. 7 includes the telltale lamps 30 of aiming instrument 12a of FIG. 5 and the photocells of aiming instrument 12b. For reasons of clarity the projection lamp for instrument 12b and the photocells for instrument 12a are omitted from FIG. 5. It will readily be perceived that even if instrument 12b is not quite parallel to the vehicle axis, this will not affect the aiming operation for instrument 12a.

In operation, each instrument is attached by a suction cup to a headlamp with the reference surfaces in contact with the aiming pads. As indicated by the arrow in FIG. 3, each instrument is rotated about the horizontal axis perpendicular to the aiming plane until it is level as shown by the telltale lamp corresponding to that adjustment. Then, as indicated in FIG. 4, each instrument is rotated about a horizontal axis parallel to the aiming plane, until the instrument is level in that direction. This adjustment is carried out by adjusting the headlamp about that horizontal axis and when the level condition occurs, the other level telltale lamp will turn off, thus assuring that the aiming plane of the headlamp is vertical. Finally, adjustment is made for parallelness as indicated by the arrow in FIG. 5 by adjusting each lamp about a vertical axis until each light beam illuminates the central photocell of the opposite instrument, whereupon the central telltale lamps will light indicating that both instruments are parallel to the longitudinal axis of the vehicle and the aiming plane is perpendicular to that axis. In this condition, the lamps will be properly focused.

A further advantageous feature of the invention, which is not shown in the drawings, is that since, electrical signals are obtained to light telltale lamps when the headlamp is out of adjustment with respect to the horizontal or vertical reference axes, the same electrical signals may be used to control automatic power screwdrivers for turning the adjusting screws 11, so that the screws will be turned automatically until the headlamps are properly adjusted and the electrical signals are turned off. Such screwdrivers may be attached to the housing 16 to engage the adjusting screws when the instruments 12 are attached to the headlamps or they may be hand held by the operators.

It will thus be seen that this invention provides a means for rapidly and accurately adjusting a vehicle headlamp which does not require the skill of an operator or rely on his judgment as to when the several adjustments are sufficiently accurate.

The invention is not intended to be limited to the above description and drawings since obvious modification and variations will be readily apparent to those skilled in the art.

It is claimed:

1. An aiming device for vehicle headlamps each having an aiming plane defined by a plurality of aiming pads comprising a pair of aiming instruments, means for securing the instruments to a pair of headlamps, means for registering the instruments with the aiming pads on the headlamps, and means for indicating whether the aiming planes are perpendicular to the vehicle longitudinal axis including a light source in each instrument focused onto the opposite instrument, a series of light responsive elements in each instrument selectively exposed to the light sources according to the attitudes of the said instruments, and circuit means including indicating lamps and including the light responsive elements for indicating whether the aiming planes are perpendicular to the vehicle longitudinal axis.

2. In an aiming device for vehicle headlamps which each have an aiming plane defined by a plurality of aiming pads comprising, a pair of aiming instruments, means for securing the instruments to a pair of headlamps, means for registering the instruments with the aiming pads on the headlamps, electrical circuit means for indicating whether each instrument is level, and means for indicating whether an aiming plane is perpendicular to the horizontal longitudinal axis of the vehicle, including a light source in one instrument focused onto the opposite instrument, a series of light responsive elements in the opposite instrument selectively exposed to the light source according to the attitude of the said one instrument, and circuit means including an indicating lamp in the said one instrument and including the light responsive elements for indicating whether the aiming planes are perpendicular to the longitudinal axis of the vehicle.

3. In a vehicle headlamp aiming device, a pair of aiming instruments, means for securing the instruments to a pair of headlamps, means for registering the instruments with aiming pads on the headlamps, electrical means for indicating levelness of each instrument relative to two horizontal axes including for each axis an electrolytic gravity sensing transducer having its outputs connected to a null circuit means with a lamp for indicating null condition and hence levelness about that axis, and means for indicating whether the aiming planes are perpendicular to the vehicle horizontal longitudinal axis including a light source in each instrument focused onto the opposite instrument, a series of light responsive elements in each instrument selectively exposed to the light sources according to the attitudes of the instrument, and a pair of circuit means each including indicating lamps in one instrument and the light responsive elements of the other instrument for indicating whether the aiming planes are perpendicular to the vehicle axis longitudinal and further indicating the direction of any error.

4. In a vehicle headlamp aiming device, a pair of electrically interconnected aiming instruments, means for securing the instruments to a pair of headlamps mounted on a vehicle, means for registering the instruments with aiming pads on the headlamps, and means for determining whether the longitudinal axes of the instruments are parallel to the longitudinal axis of the vehicle including a light source on each instrument beamed toward the other instrument, a light sensitive element on each instrument for detecting a received light beam when the light emitting instrument is parallel to the said axis, and indicating circuitry including an indicating lamp on each instrument connected with the photocell on the opposite instrument for indicating parallelness of each instrument to the vehicle axis.

5. In a vehicle headlamp aiming device, a pair of electrically interconnected aiming instruments, means for securing the instruments to a pair of headlamps mounted on a vehicle, means for registering the instruments with aiming pads on the headlamps, electrical circuitry including electrical levelness transducers for indicating levelness of each instrument; and means for determining whether the longitudinal axes of the instruments are parallel to the horizontal longitudinal axis of the vehicle including a light source on each instrument beamed toward the other instrument, a series of photocells on each instrument for detecting the position of each received light beam whereby one position of each light beam corresponds to a parallel condition of the instruments, and indicating circuitry including indicating lamps on each instrument connected with photocells on the opposite instrument for indicating parallelness of each instrument to the vehicle axis.

References Cited

UNITED STATES PATENTS

| | | | |
|---|---|---|---|
| 2,940,174 | 6/1960 | Shoemaker | 356—121 |
| 2,977,843 | 4/1961 | Graeber et al. | 356—121 |

RONALD L. WIBERT, Primary Examiner

T. R. MOHR, Assistant Examiner

PO-1050
(5/69)

UNITED STATES PATENT OFFICE
CERTIFICATE OF CORRECTION

Patent No. 3,520,618              Dated    July 14, 1970

Inventor(s)   Francis W. Bentley

It is certified that error appears in the above-identified patent and that said Letters Patent are hereby corrected as shown below:

In Column 2, line 44, "estabilshed" should be changed to -- established --.

In Column 5, Claim 3, line 11, "axis longitudinal" should be changed to read -- longitudinal axis --.

SIGNED AND
SEALED
OCT 13 1970

(SEAL)
Attest:

Edward M. Fletcher, Jr.
Attesting Officer

WILLIAM E. SCHUYLER, JR.
Commissioner of Patents